United States Patent [19]

Guha

[11] Patent Number: 5,841,440
[45] Date of Patent: Nov. 24, 1998

[54] SYSTEM AND METHOD FOR USING A POINTING DEVICE TO INDICATE MOVEMENT THROUGH THREE-DIMENSIONAL SPACE

[75] Inventor: Ramanathan V. Guha, Los Altos, Calif.

[73] Assignee: Apple Computer, Inc., Cupertino, Calif.

[21] Appl. No.: 767,693

[22] Filed: Dec. 17, 1996

[51] Int. Cl.⁶ ................................................ G06T 15/00
[52] U.S. Cl. .......................................................... 345/419
[58] Field of Search .................................. 345/419, 420, 345/421, 422, 423, 424

[56] References Cited

U.S. PATENT DOCUMENTS

| | | | |
|---|---|---|---|
| 5,684,943 | 11/1997 | Abraham et al. | 345/419 |
| 5,687,304 | 11/1997 | Kiss | 345/419 |
| 5,699,497 | 12/1997 | Brdahl et al. | 345/419 |
| 5,745,665 | 4/1998 | Pasco | 345/419 |

*Primary Examiner*—Cliff N. Vo
*Attorney, Agent, or Firm*—Fenwick & West LLP

[57] ABSTRACT

A system and method of displaying movement in three-dimensional space in response to input from a conventional two-dimensional pointing device such as a mouse or trackball. The three-dimensional space is projected onto a two-dimensional plane for display in a window on a display screen. A viewpoint position, which may be the center of the window, is defined as the current virtual position of the "camera" through which the three-dimensional space is viewed. The user manipulates an on-screen cursor across the window to specify a direction of movement in the two-dimensional plane. A three-dimensional direction of movement is derived from the user's input by defining a sphere having a center corresponding to a the center of the two-dimensional plane, and determining the intersection of a line perpendicular to the plane at the cursor location with the surface of the sphere. The direction of movement is then defined as a vector from the origin to the determined intersection. The system and method distinguish between navigation commands and object manipulation commands according to the timing and context of the commands.

32 Claims, 9 Drawing Sheets

SYSTEM AND METHOD FOR USING A POINTING DEVICE TO INDICATE MOVEMENT THROUGH THREE-DIMENSIONAL SPACE

CROSS-REFERENCE TO RELATED APPLICATION

This application is related to U.S. patent application Ser. No. 08/744,611 for "Method, Apparatus and Computer Program Products to Simulate the Display of Objects in Three Dimensions", by Ramanathan V. Guha, filed Nov. 6, 1996, the disclosure of which is incorporated herein by reference.

BACKGROUND OF THE INVENTION

1. Field of the Invention

The present invention relates generally to navigation in a virtual three-dimensional space, and more particularly to a system and method for indicating and displaying movement through three-dimensional space.

2. Description of Background Art

Many computer software applications simulate movement through a virtual three-dimensional environment, or space. The three-dimensional space typically contains a plurality of objects, each having particular visual characteristics and a defined position in three-dimensional space. A two-dimensional projection of the three-dimensional space is displayed in a window on a display screen, including projections of all or some of the objects.

The techniques for projecting three-dimensional space onto a two-dimensional display window are generally known in the art. See, for example, J. Foley et al., *Computer Graphics: Principles and Practice*, 2 d. ed., Addison-Wesley, 1990. Typically, a viewpoint position and orientation are established within the three-dimensional space, specifying the position and orientation of a virtual "camera" through which the user views the environment. Objects within a viewable area of the three-dimensional space are projected onto the display window by scaling objects according to their distance from the viewpoint position, so that more distant objects are shown smaller than closer ones. Other techniques may also be used to represent relative detail, such as changes in color, level of detail, and the like.

Many such conventional systems provide mechanisms by which a user may change the viewpoint position. By successively redrawing objects according to changed viewpoint positions, the system can simulate movement through the three-dimensional space.

In order to effectively provide such simulated three-dimensional movement, the system must be capable of accepting input from a user specifying desired directions and speeds of movement. Conventional, commonly-used input devices are typically capable of indicating movement on a computer display in only two dimensions. More complex pointing devices such as virtual reality gloves are available but tend to be more expensive than commonly-available devices such as mice or trackballs.

In many systems, direct manipulation of on-screen objects is performed by positioning a cursor under the control of an input device such as a mouse or trackball and clicking a button. If the same input device is employed for both manipulation and navigation, ambiguity may result when the user clicks the button. In other words, it may not be clear whether the user wishes to manipulate an on-screen object or to move in the direction pointed. Modifier keys or multiple mouse buttons may be employed, but these techniques introduce complexity, increase learning time and confusion, and detract from the intuitive nature of the interface.

What is needed is a system and method for a user to indicate movement in three-dimensional space in an intuitive manner using a conventional, commonly available input device such as a mouse or joystick. In addition, what is needed is a system and method for distinguishing between navigation and manipulation commands in a manner that does not significantly increase the complexity of the system from the user's point of view.

SUMMARY OF THE INVENTION

The present invention provides a system and method of displaying movement in three-dimensional space in response to input from a conventional two-dimensional pointing device such as a mouse or trackball.

The three-dimensional space is projected onto a two-dimensional plane for display in a window on a display screen. A viewpoint position, which may be the center of the window, is defined as the current virtual position of the "camera" through which the three-dimensional space is viewed. Three axes may thus be defined: a horizontal x-axis and a vertical y-axis, both parallel to the display window, and a z-axis representing movement perpendicular to the display window. The viewpoint position is located at the origin of the axes.

The user manipulates an on-screen cursor across the window to specify a direction of movement in the x- and y-axes. Keyboard keys or mouse buttons are pressed to specify "forward" or "backward" movement (corresponding to the positive or negative direction of the z-axis).

A direction of movement is derived from the user's input as follows. A sphere is defined having a center corresponding to the origin of the axes and thus corresponding to the viewpoint position. A line is defined which is perpendicular to the display window and which intersects the plane of the window at the coordinates specified by the position of the on-screen cursor. If the cursor position lies within the radius of the circle defined by the sphere's projection in the display window, the line will intersect the surface of the sphere at two points, one representing movement into the screen (corresponding to "forward" movement) and one representing movement out of the screen (corresponding to "backward" movement). One of the two points is selected based on the user's keyboard or mouse button input. The direction of movement is then defined as a vector from the origin to the selected point on the sphere.

If the cursor position lies at the edge of the circle defined by the sphere's projection, or outside the bounds of the circle, the direction of movement is defined as a vector from the origin to the x- and y-coordinates of the cursor position, with a z-component of zero. This represents movement along the plane of projection.

The display is then adjusted to reflect movement in the direction of the defined vector by changing the coordinates of the viewpoint position and generating a new two-dimensional projection. In accordance with user input, the speed of movement may be changed by scaling the vector by a specified factor. The cursor may be moved as the display is adjusted, resulting in corresponding adjustment of the movement vector using the technique described above.

If a non-linear projection technique is employed, as described in related U.S. patent application Ser. No. 08/744, 611 for "Method, Apparatus and Computer Program Products to Simulate the Display of Objects in Three Dimensions", the viewpoint position is adjusted to compensate for the non-linearity and to preserve the illusion of movement in the desired direction.

In addition, the three-dimensional navigation scheme of the present invention may be employed in an application wherein the user is able to manipulate objects within the three-dimensional environment. For example, the user may wish to move or activate buttons or icons within the window. Such manipulation is often performed using the same input device, such as a mouse or trackball, and the same keys or buttons, as is used for navigation. In order to preserve a simple and intuitive user interface, one embodiment of the present invention provides a mechanism for distinguishing among the user's desired actions based on the context and nature of the user input. For example, if the user clicks a mouse button on an area of the screen and holds down the button for some period of time (such as for example 0.5 seconds) without substantially moving the cursor, this is interpreted as a navigation command. However, if the user clicks the mouse button and immediately starts moving, this is interpreted as an object manipulation command specifying movement of the object under the cursor (if any). If no object is under the cursor, this command is interpreted as navigation. Thus, the intended action is determined based on the context of the user's input.

DETAILED DESCRIPTION OF THE INVENTION

Figure 1A:
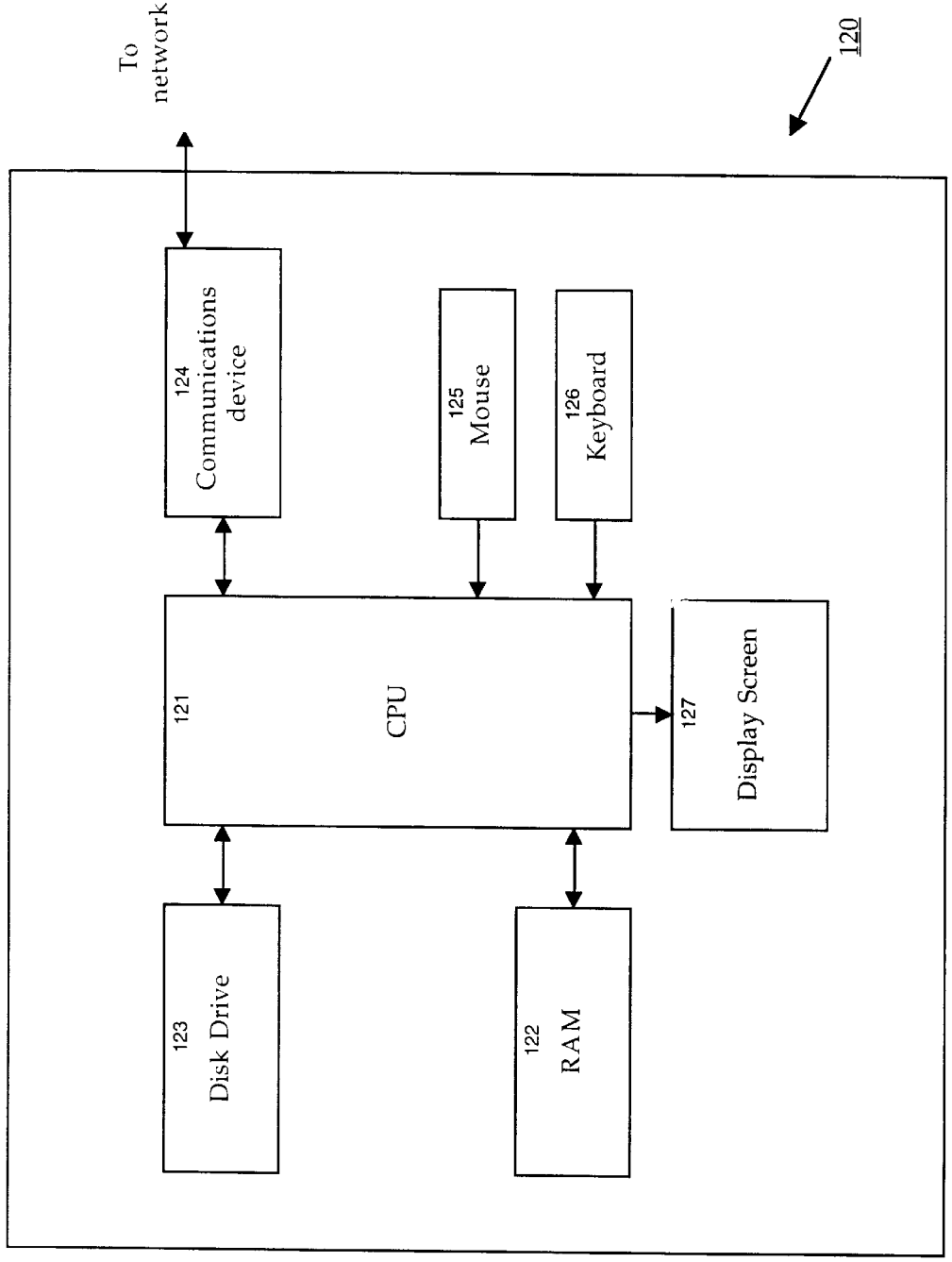
FIG. 1A is a block diagram of a hardware architecture for practicing the present invention.

Referring now to FIG. 1A, there is shown a block diagram of a hardware configuration for practicing the present invention. In one embodiment, the present invention is implemented as software running on a conventional personal computer such as an Apple® Macintosh® computer. Thus, the hardware architecture of system 120 as shown in FIG. 1A may be implemented as a combination of components of such a computer, though other implementations may also be used. Central processing unit (CPU) 121 executes software instructions and interacts with other components to perform the techniques of the present invention. Random-access memory (RAM) 122 stores software instructions to be executed by CPU 121, and may store other data to act as a workspace in the implementation of the present invention, including for example, representations of object characteristics and positions in three-dimensional space. Disk drive 123 provides long-term storage of data and software programs. Input devices such as mouse 125 and keyboard 126 facilitate user control of the operation of system 120, including navigation through a simulated three-dimensional environment. Display screen 127 is an output device such as a cathode-ray tube for the display of two-dimensional projections of the three-dimensional space under the control of CPU 121. System 120 may also include communications device 124 such as, for example, a modem for connection to a computer network such as the Internet.

Figure 1B:
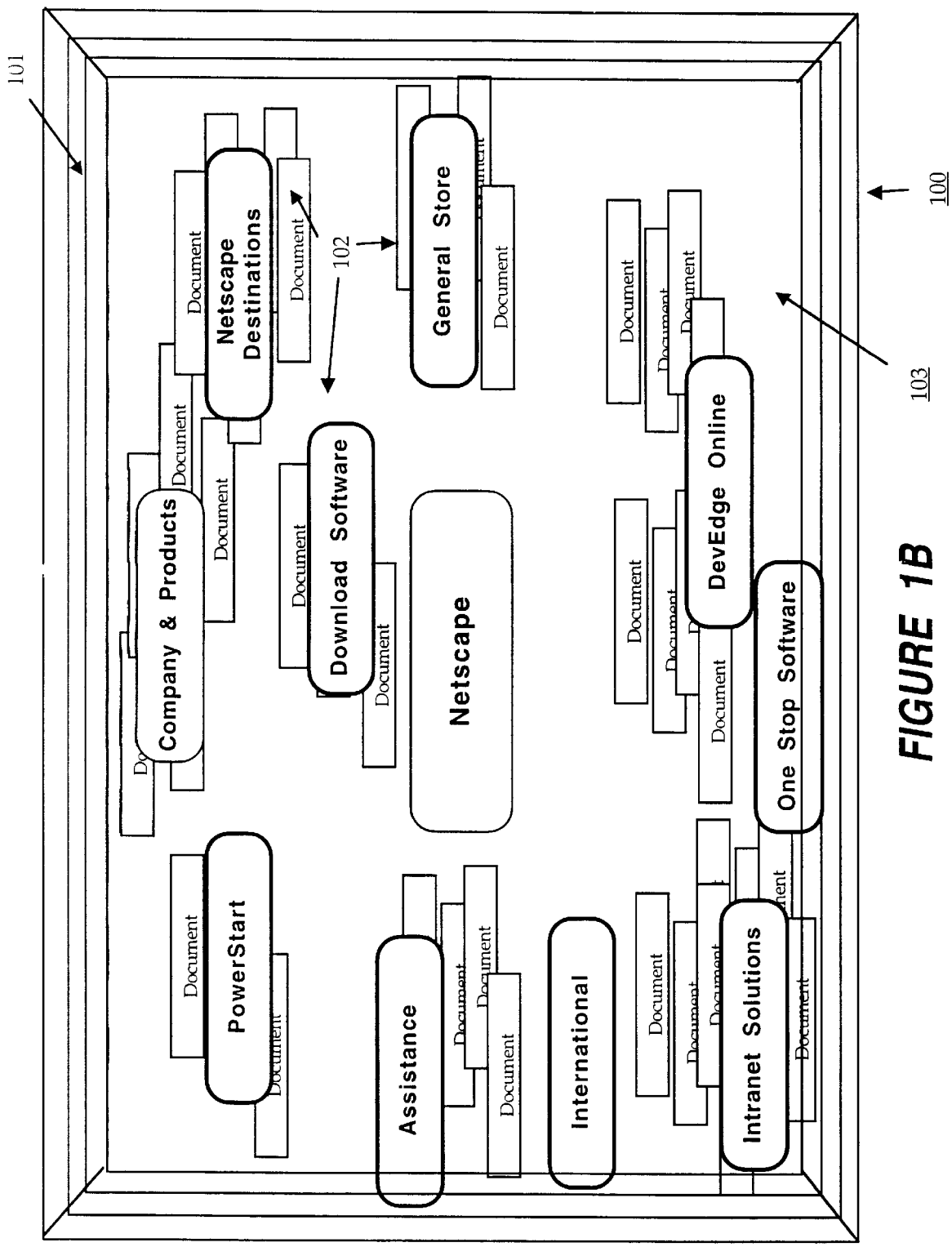
FIG. 1B is an example of a screen shot showing a window containing a two-dimensional projection of a three-dimensional space.

Referring now to FIG. 1B, there is shown a sample screen shot of a window 100 containing a two-dimensional projection 103 of a three-dimensional space. In one embodiment, window 100 is displayed on display screen 127. Objects 102 are located at various positions in the three-dimensional space and are projected onto window 100 using techniques that are known in the art. In the example shown, the impression of depth is created by overlaying closer objects 102 on top of objects 102 that are farther away. In addition, closer objects 102 are displayed at a larger size than objects 102 that are farther away. Finally, the example of FIG. 1B differentiates among several distance planes by the use of distinct colors. Other visual cues representing relative distance may also be used. In one embodiment, the projection is performed using adjusted spread between objects 102 as described in related application Ser. No. 08/744,611. Margin frame 101 provides a navigational tool for moving parallel to the plane of the projection, as will be described in more detail below.

In one embodiment, objects 102 represent documents and directories that may be manipulated, opened, or activated by the user. In one embodiment, system 120 is connected to a network such as the Internet, and some objects 102 may represent web pages or other documents accessible by system 120 over the network via communications device 124.

The present invention is directed towards a system and method of navigating through a three-dimensional space as exemplified in FIG. 1B.

Figure 5:
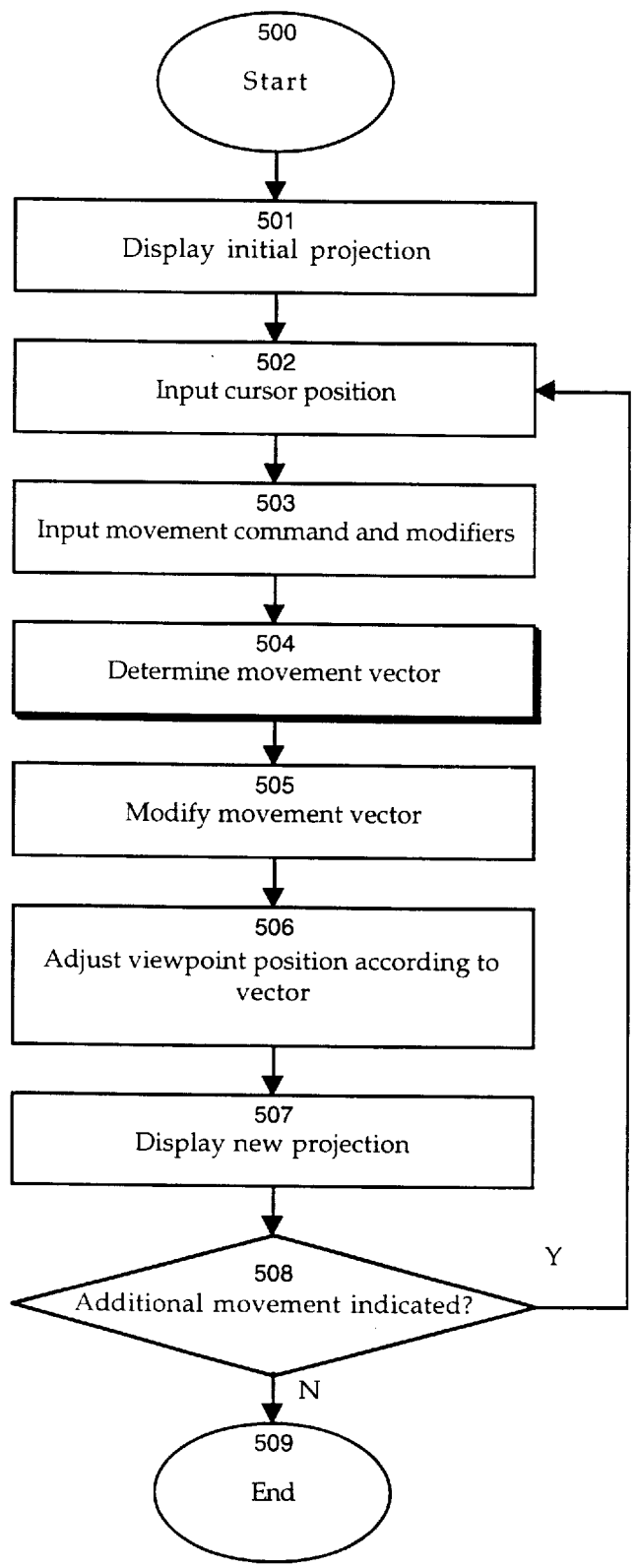
FIG. 5 is a flowchart of a method of indicating and displaying movement through three-dimensional space according to the present invention.

Referring now to FIG. 5, there is shown a flowchart of a method of indicating and displaying movement through three-dimensional space according to the present invention. An initial viewpoint position is established. Based on this viewpoint position, system 120 generates and displays 501 an initial two-dimensional projection of a three-dimensional space in a window 100 on display screen 127.

In one embodiment, such display is generated by conventional projection methods. In another embodiment, the two-dimensional projection is generated in a nonlinear manner, as described in related U.S. patent application Ser. No. 08/744,611. Related U.S. patent application Ser. No. 08/744,611 describes a hierarchical arrangement of data, with each object being assigned a level in the hierarchy. An object is related to one or more objects on the level beneath it by being a parent of such lower level objects, with each of the lower level objects having a common parent being siblings to one another. A two-dimensional projection of a three-dimensional space allows the user to view hierarchically arranged data by displaying objects at each level in a separate plane, with each plane being positioned at a different distance (z-value) from the user. The relationships among sibling objects and between child and parent objects may be graphically represented by clustering the child objects around the projection of their parent on the plan directly behind the plane containing the parent. However, as the plane containing the child objects approaches the window, it is desirable to ensure adequate space between the objects to allow the user to maneuver among the objects and to allow room to display the descendants of the child objects in an uncluttered way. Thus, the related patent application describes a technique of adjusting the spacing between objects differently from the size of the objects as the user navigates in three-dimensional space. In effect, as the user navigates closer to a set of objects, the objects appear to spread apart from one another more quickly than they are growing in size. As objects approach, the spread between two objects, representing the distance between their projections, is determined using the prior spread, the increase in size of the objects, and a scaling factor or scaling factor function.

One example of a scaling factor function is:

$$f(n) = \frac{K}{l} \times \sum_{m=1}^{n} \frac{1}{\sqrt{b_m}} \qquad \text{(Eq. 1)}$$

where:

K is a constant;

l=the distance between the projection window and the first visible plane;

n=the number of planes between the projection window and the plane of the object in question;

$b_m$-=1+the number of sibling objects of the object or its ancestor in the mth displayed plane.

Figure 8:
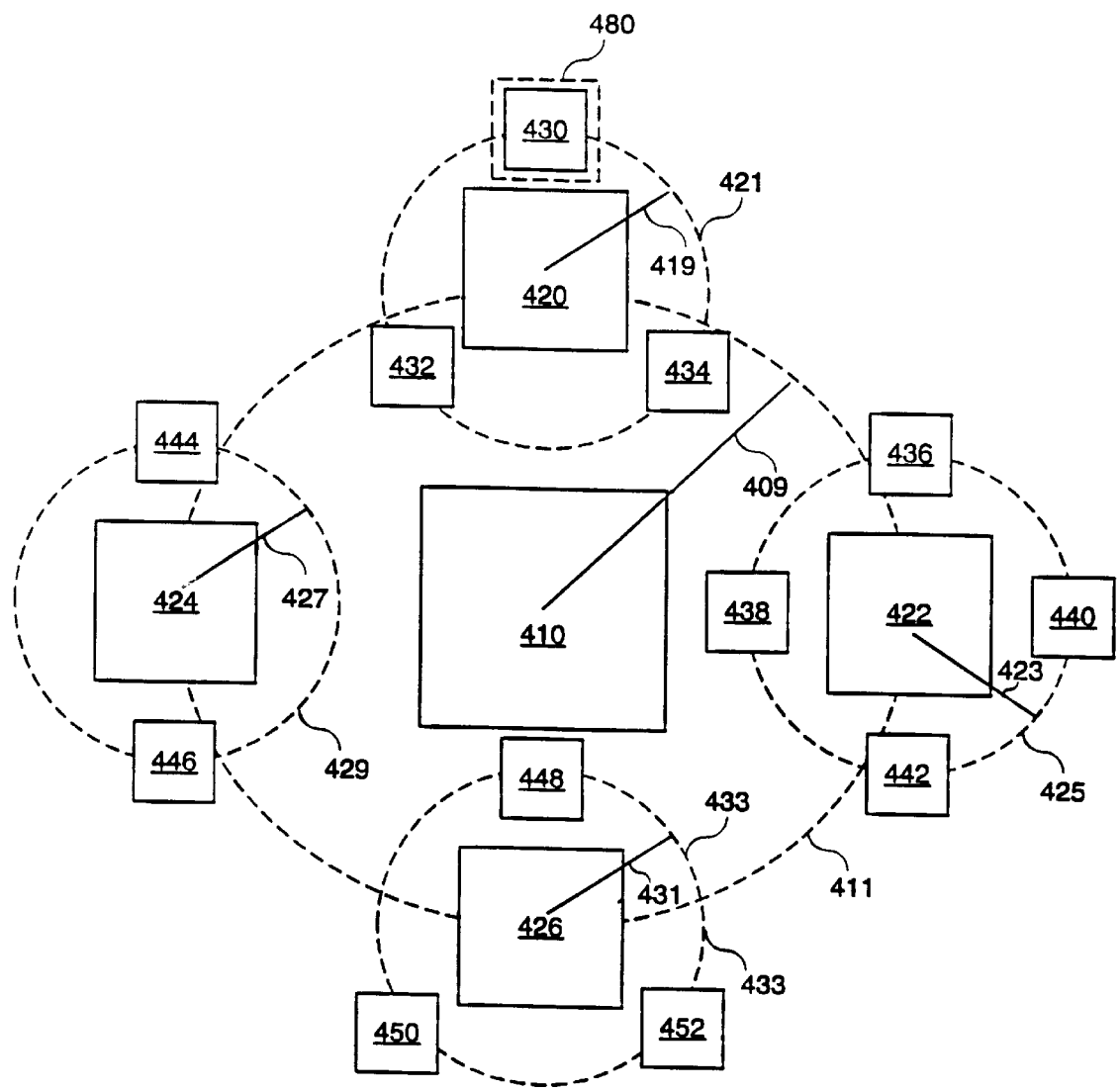
FIG. 8 is a block diagram of objects displayed in three planes according to one embodiment of the present invention.

Referring now to FIG. 8, there is shown a sample two-dimensional projection of a hierarchical arrangement of objects in three-dimensional space. Objects 410, 420, 422, 424, 426, 430, 432, 434, 436, 438, 440, 442, 444, 446, 448, 450, and 452 are displayed on three planes. Objects 420, 422, 424, 426, all displayed on plane 2, are arranged in a circle 411 having a radius 409 around their parent object 410, displayed on plane 1. Child objects 430, 432, 434, all displayed on plane 3, are arranged in a circle 421 having a spread equal to radius 419 around their parent object 420. Other objects 436, 438, 440, 442, 444, 446, 448, 450, 452, all displayed on plane 3, are arranged in circles 425, 429, 433 having radii 423, 427, 431 around parent objects 422, 424, 426, as shown in the Figure. The spread between each of the child objects 420, 422, 424, 426, 430, 432, 434, 436, 438, 440, 442, 444, 446, 448, 450, 452 and its parent is equal to the radius of the circle 411, 421, 425, 427, 429 on which the object is displayed.

Thus, for circle 425, $b_1$=1 (1+0 sibling objects of object 410), $b_2$=4 (1+3 sibling objects of object 422), and $b_3$=4 (1+3 sibling objects for each object 436, 438, 440, 442). The scaling factor given by Eq. 1 will thus be (K/l)×⅓×½×½, or (K/l)×¼, or 0.25(K/l). By contrast, the scaling factor for circle 429 is 0.35(K/l). The displayed radius of each circle is divided by the scaling factor, so that circles on which more objects are placed grow larger than circles on which fewer objects are placed.

The position of a given object in the two-dimensional projection is determined by reference to the position of its parent object using the equations:

$$x_{projected} = (x_1 - x_u)f(1) + \sum_{m=2}^{n} x_m f(m) \qquad \text{(Eq. 2)}$$

$$y_{projected} = (y_1 - y_u)f(1) + \sum_{m=2}^{n} y_m f(m) \qquad \text{(Eq. 3)}$$

where:

$x_{projected}$, $y_{projected}$ represent the projected coordinates of the object in window 100;

$x_1$, $y_1$ are the x and y coordinates of the highest-level visible ancestor of the object;

$x_u$, $y_u$ are the x and y coordinates of the viewpoint position;

f( ) is the scaling function, for example as described in Eq. 1;

n is the number of planes between the projection plane and the plane containing the object, plus 1; and $x_m$, $y_m$ are the x and y coordinates of the ancestor of the object on plane m, relative to the x and y coordinates of the ancestor's immediate parent.

Figure 2:
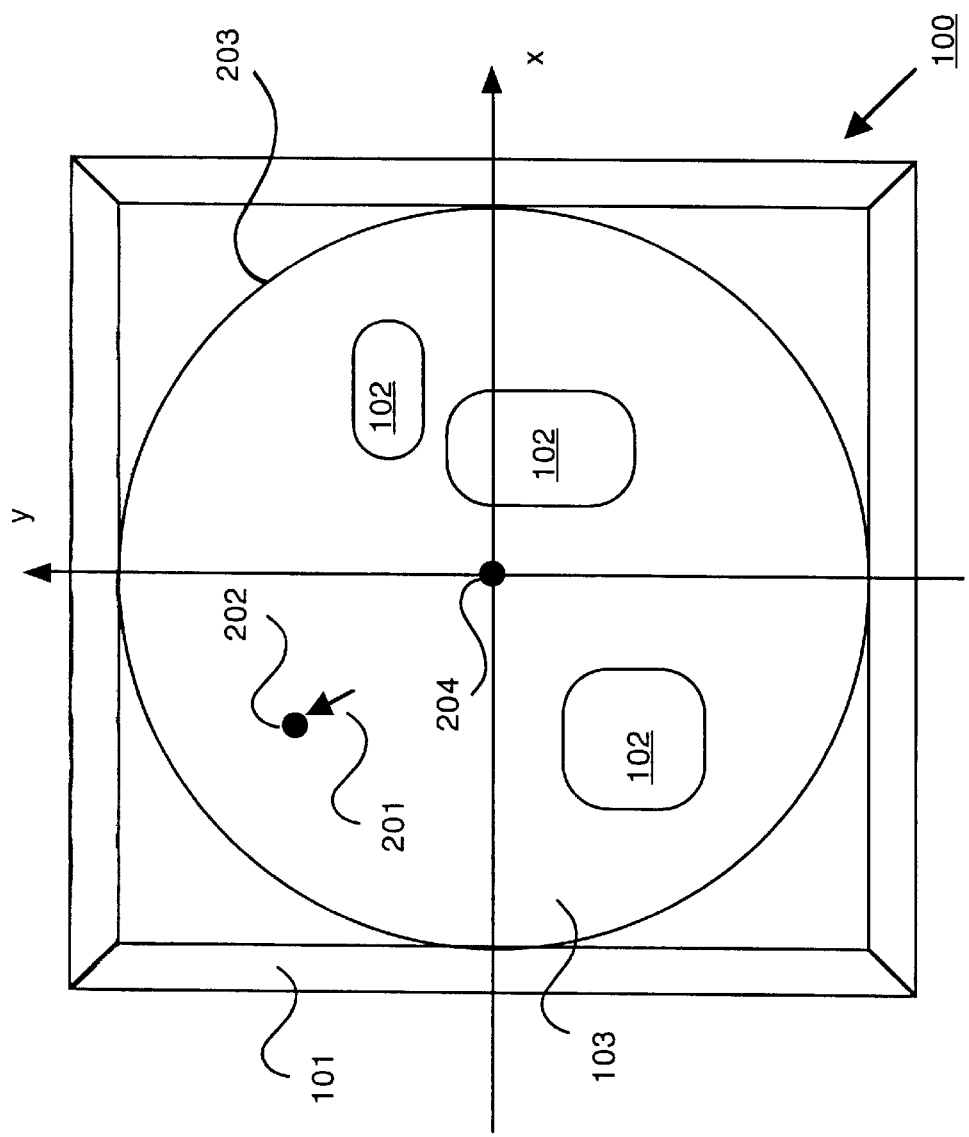
FIG. 2 is a front view of a window containing a two-dimensional projection of a three-dimensional space.

Referring now also to FIG. 2, there is shown a front view of a simplified representation of a window 100 containing a two-dimensional projection 103 of a three-dimensional space as displayed 501 by system 120. In one embodiment of the present invention, the three-dimensional space can be described in terms of a coordinate system including x- and y-axes as shown, along with a z-axis (not shown) which extends in a direction perpendicular to the plane of window 100. All three axes have an origin 204 which corresponds to the center of window 100. In one embodiment, origin 204 is also the viewpoint for the two-dimensional projection. Other coordinate schemes and orientations may be used, including, for example, placing the viewpoint at some non-zero position along the z-axis. In one embodiment, such as that illustrated in FIG. 1, the location of origin 204 is not displayed on the screen.

Referring again to FIG. 5, system 120 accepts 502 user input from mouse 125 or keyboard 126 specifying a cursor position in window 100. Cursor 201 is a movable pointer that is controlled by the user. In one embodiment, the user manipulates a pointing device such as mouse 125 or trackball (not shown) to control the position of cursor 201 within window 100, although other mechanisms such as a keyboard 126 may be used. The user selects a desired direction for movement by positioning cursor 201. The user then initiates movement by providing a movement command 503. In one embodiment, such movement command is provided by clicking and holding down a mouse button. Alternatively, such movement command may be provided via keyboard 126. Point 202 in FIG. 2 indicates the position of cursor 201 at the moment the user initiates movement.

In one embodiment, the user may further specify the direction and speed of desired movement via modifier keys, such as the following:

Forward movement ("into" the screen): hold mouse button down

Backward movement ("out of" the screen): hold Command or Control key on keyboard 126 while holding mouse button down, or hold second mouse button down Accelerated movement: hold Shift key while performing other commands Highly accelerated movement: hold Control or Alt key while performing other commands Once the movement command has been provided by the user, the system of the present invention determines 504 a movement vector representing a direction of movement in three-dimensional space. The movement vector is a three-dimensional vector specifying a direction and magnitude of movement.

Figure 3:
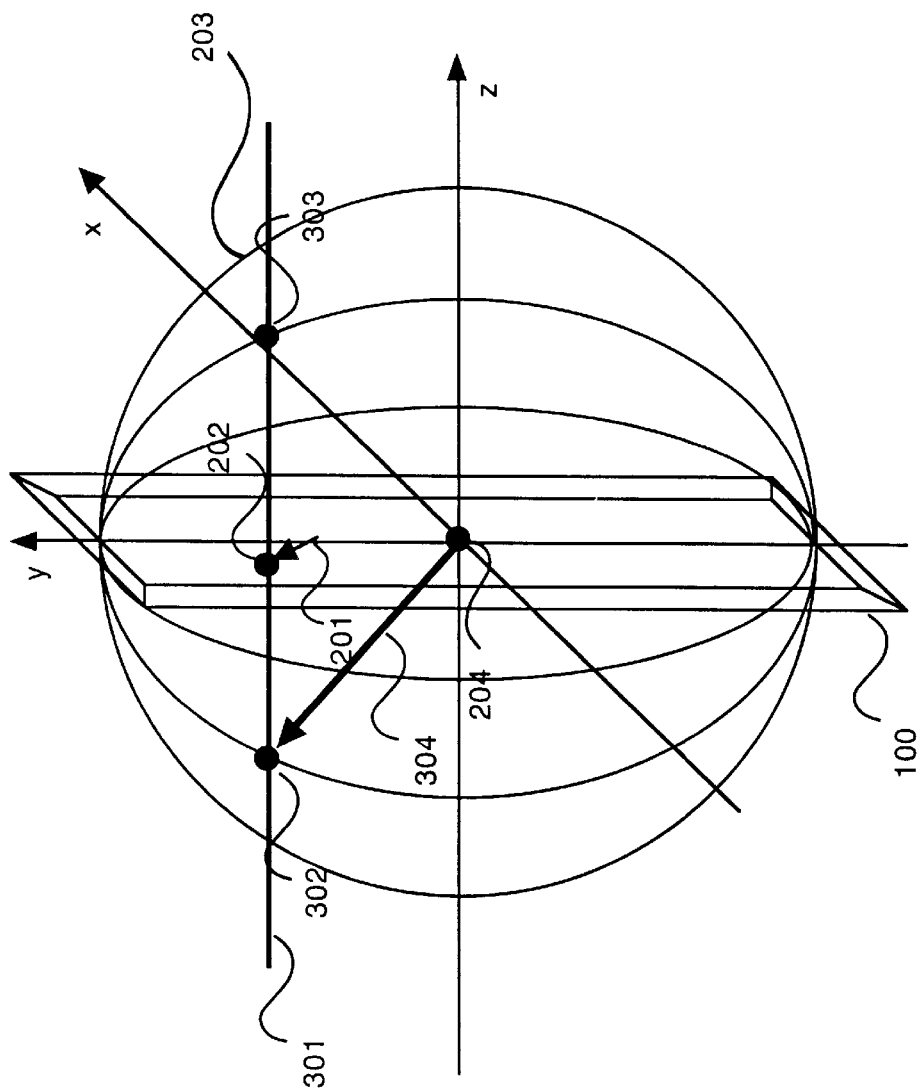
FIG. 3 is a side view of a window containing a two-dimensional projection of a three-dimensional space.
Figure 6:
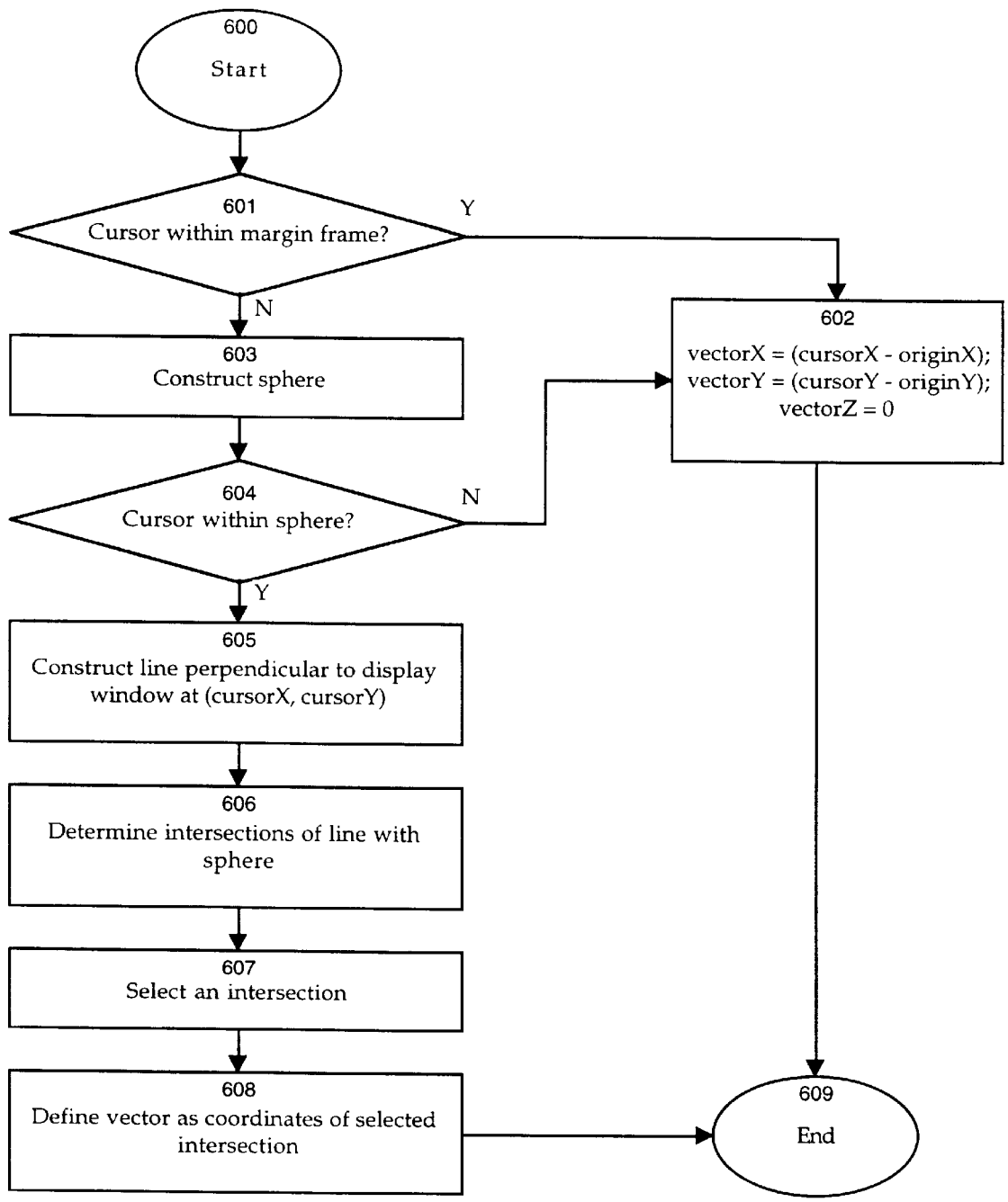
FIG. 6 is a flowchart of a method of determining a movement vector according to the present invention.

Referring now to FIG. 6, there is shown a flowchart of a method of determining 504 a movement vector according to one embodiment of the present invention. Referring also to FIG. 3, there is shown a side view of the simplified projection shown in FIG. 2, with additional constructions illustrating the method of FIG. 6. As described previously, the three-dimensional movement vector is determined based on the two-dimensional position of cursor 201. If cursor 201 is within margin frame 101 at the time the movement command is initiated, the movement vector is assigned 602 a z-value of zero, so that the viewpoint position will move parallel to the plane of the projection. Thus, the user can specify horizontal, vertical, or diagonal movement in the x-y plane if desired, by positioning cursor 201 in the appropriate location in within margin frame 101.

If cursor 201 is not within margin frame 101, system 120 constructs 603 a sphere 203. In one embodiment, sphere 203 is not displayed on screen 127, but is used for determination of the movement vector as follows. In one embodiment, sphere 203 has a center corresponding to the center of window 100 and a diameter such that the edge of sphere 203 touches each of the four inside borders of margin frame 101. If window 100 is not square, a spheroid may be used in place of sphere 203. In an alternative embodiment, sphere 203 is constructed having some other size and/or center point.

Referring again to FIG. 2, the projection of sphere 203 onto window 100 forms a circle. If cursor 201 is not within the circle defined by the projection of sphere 203, the movement vector is assigned 602 a z-value of zero, so that the viewpoint position will move parallel to the plane of the projection.

Referring again to FIGS. 3 and 6, if cursor 201 is within the circle, system 120 constructs 605 a line 301 perpendicular to window 100 and passing through the point 202 defined by the location of cursor 201. System 120 then determines 606 the intersections 302, 303 of line 301 with the surface of sphere 203. In general, two such intersections 302, 303 will exist, one on each side of the x-y plane. The three-dimensional coordinates of these intersections can be represented as:

$$(\Delta x, \Delta y, \Delta z) = (x_{cursor}, y_{cursor}, \sqrt{2rm - m^2})$$ (Eq. 4)

and $$(\Delta x, \Delta y, \Delta z) = (x_{cursor}, y_{cursor}, -\sqrt{2rm - m^2})$$ (Eq. 5)

where:

$x_{cursor}$ and $y_{cursor}$ are the coordinates of cursor 201 in window 100;

r is the radius of sphere 203; and m is the distance between viewpoint position 204 and cursor 201, such that $$m = \sqrt{x_{cursor}^2 + y_{cursor}^2}.$$

System 120 then selects 607 one of the two intersections. If the z-axis points "out" of the display screen, the intersection 303 having a positive z-value represents backwards movement "out" of the screen, while the intersection 302 having a negative z-value represents forward movement "into" the screen. Thus, the selection of one of the two intersections is made based on the user's input regarding forward or backward movement. As described above, in one embodiment backward movement is indicated by holding a command or control key on keyboard 126.

In the example of FIG. 3, intersection 302 is selected, representing a negative z-value corresponding to forward motion "into" the screen. System 120 defines 608 movement vector 304 using the coordinates of intersection 302. This movement vector 304 is then modified and applied as described above in connection with FIG. 5.

In another embodiment, system 120 determines 504 a movement vector as (x, y, z), where x and y are the coordinates of cursor 201 in window 100, and z is an arbitrary z-value that may be a predetermined constant, or may be user-configurable, or may be some linear or nonlinear function of x and y. z may be multiplied by −1 to indicate movement "out of" the window.

Referring again to FIG. 5, system 120 modifies 505 the movement vector according to the modifier keys activated by the user, if appropriate. For example, if accelerated movement is indicated, system 120 multiplies the terms of the movement vector by some constant in order to increase its magnitude.

System 120 then adjusts 506 the viewpoint position 204 in the direction and magnitude specified by the movement vector. In one embodiment, this is accomplished by adding the terms of the movement vector to the coordinates of the viewpoint and assigning the result to the viewpoint.

As described above, in one embodiment of the present invention, the two-dimensional projection is generated using a scaling factor. When a scaling factor is used, nonlinear projection results, and thus it is advantageous to adjust the viewpoint position to preserve the illusion of three-dimensional movement in the desired direction. Specifically, when the user is moving in the direction of a particular object 102, it is desirable that the apparent position of the object 102 in the two-dimensional projection remains stationary, or in an alternative embodiment, changes in a controlled manner by moving object 102 toward the center of the screen.

Figure 7:
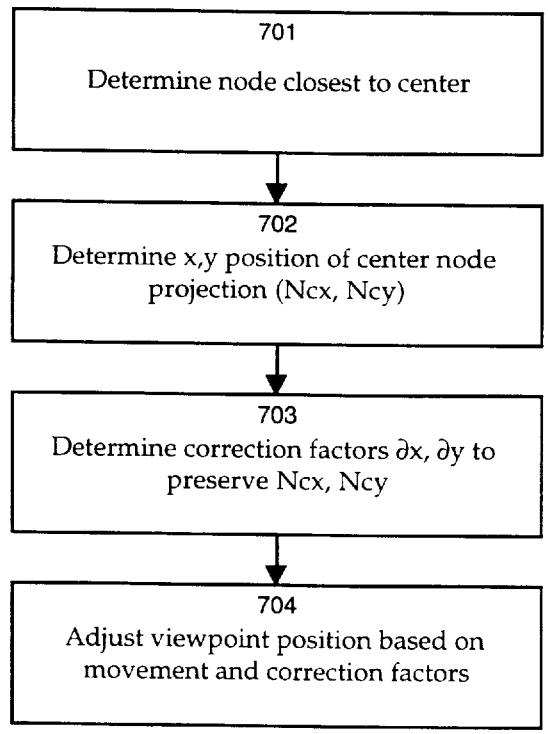
FIG. 7 is a flowchart of a method of correcting viewpoint position for nonlinear movement according to the present invention.

Referring now to FIG. 7, there is shown a flowchart of a method of adjusting the viewpoint position to preserve the illusion of three-dimensional movement in the desired direction. System 120 identifies 701 which node, or on-screen object 102, is closest to the center of window 100. In an alternative embodiment, system 120 identifies a node that is closest to the cursor position. This "center node" is designated as $N_C$. System 120 then determines 702 the x and y coordinates of the center node in the two-dimensional projection of window 100. These are designated as $N_{Cx}$, $N_{Cy}$. The viewpoint position in three-dimensional space before application of the movement vector is designated as $(x_u, y_u, z_u)$. The movement vector is designated as $(\Delta x, \Delta y, \Delta z)$. Thus, if linear projection is used, viewpoint position is updated 506 by adding the movement vector to the viewpoint position, so that:

$$x_{unew} = x_{uold} + \Delta x;$$ (Eq. 6)

$$y_{unew} = y_{uold} + \Delta y;$$ (Eq. 7)

$$z_{unew} = z_{uold} + \Delta z.$$ (Eq. 8)

If nonlinear projection is used, $x_{unew}$ and $y_{unew}$ are then adjusted as follows:

$$x_{uadj} = x_{unew} + \partial x;$$ (Eq. 9)

$$y_{uadj} = y_{unew} + \partial y;$$ (Eq. 10)

where $\partial x$, $\partial y$ are selected such that $N_{Cx}$, $N_{Cy}$ do not change, so that the apparent position of the center node on the screen remains constant.

System 120 determines $\partial x$ by setting $$N_{Cxold} = N_{Cxnew}$$ (Eq. 11)

and solving for $\partial x$. Thus, applying Eqs. 2 and 3, $$N_{Cxold} = (x_1 - x_u)f_{before}(1) + \sum_{m=2}^{n} x_m f_{before}(m); \quad \text{(Eq. 12)}$$

and $$N_{Cxnew} = (x_1 - x_u - \partial_x)f_{after}(1) + \sum_{m=2}^{n} x_m f_{after}(m). \quad \text{(Eq. 13)}$$

Setting these equal to each other, we obtain:

$$(x_1 - x_u)f_{before}(1) + \sum_{m=2}^{n} x_m f_{before}(m) = \quad \text{(Eq. 14)}$$

$$(x_1 - x_u - \partial_x)f_{after}(1) + \sum_{m=2}^{n} x_m f_{after}(m)$$

$\partial x$ can then be obtained by solving Eq. 14, so that:

$$\partial_x = x_1 - x_u - \frac{(x_1 - x_u)f_{before}(1) + \sum_{m=2}^{n} x_m f_{before}(m) - \sum_{m=2}^{n} x_m f_{after}(m)}{f_{after}(1)} \quad \text{(Eq. 15)}$$

If the scaling function of Eq. 1 is employed, we obtain:

$$\partial_x = x_1 - x_u - \frac{(x_1 - x_u)\frac{K}{l_{before}} \times \frac{1}{\sqrt{b_1}} + \sum_{m=2}^{n} x_m \left(\frac{K}{l_{before}} \times \prod_{p=1}^{m} \frac{1}{\sqrt{b_p}}\right) - \sum_{m=2}^{n} x_m \left(\frac{K}{l_{after}} \times \prod_{p=1}^{m} \frac{1}{\sqrt{b_p}}\right)}{\frac{K}{l_{after}} \times \frac{1}{\sqrt{b_1}}} \quad \text{(Eq. 16)}$$

which reduces to:

$$\partial_x = \left(1 - \frac{l_{after}}{l_{before}}\right)(x_1 - x_u) - \quad \text{(Eq. 17)}$$

$$\sqrt{b_1}\left(1 + \frac{l_{after}}{l_{before}}\right)\sum_{m=2}^{n} x_m \left(\prod_{p=1}^{m} \frac{1}{\sqrt{b_p}}\right).$$

A similar technique is employed for determining $\partial y$, so that:

$$\partial_y = \left(1 - \frac{l_{after}}{l_{before}}\right)(y_1 - y_u) -$$

$$\sqrt{b_1}\left(1 + \frac{l_{after}}{l_{before}}\right)\sum_{m=2}^{n} y_m \left(\prod_{p=1}^{m} \frac{1}{\sqrt{b_p}}\right).$$

For example, in FIG. 8, if object 410 is located at (0, 0, 100); the viewpoint is located at (20, 0, 0); object 422 is located at (10, 0, 140); object 440 is located at (20, 0, 180); and the user moves the viewpoint forward to (20, 0, 50); the following values apply.

$N_C$, the center node, is object 440;
$l_{before}$=distance to plane of object 410 before movement= 100−0=100;
$l_{after}$=distance to plane of object 410 after movement= 100−50=50;
$x_1$=x-position of object 410=0;
$x_2$=x-position of object 422=10;
$x_3$=x-position of object 440=20;
$x_u$=x-position of viewpoint=20;
$b_1$=1+number of siblings of object 410=1+0=1;
$b_2$=1+number of siblings of object 422=1+3=4;
$b_3$=1+number of siblings of object 440=1+3=4.

Thus, $$\partial_x = \left(1 - \frac{50}{100}\right)(0 - 20) - \sqrt{1}\left(1 + \frac{50}{100}\right)\left(10\frac{1}{\sqrt{1}}\frac{1}{\sqrt{4}} + 20\frac{1}{\sqrt{1}}\frac{1}{\sqrt{4}}\frac{1}{\sqrt{4}}\right) \quad \text{(Eq. 19)}$$

$$= -10 - (1.5)(5 + 5)$$

$$= -25.$$

Therefore, in order to preserve the illusion of movement toward object 440 by maintaining its position in the two-dimensional projection, the viewpoint position is moved along the x-axis by −25. Assuming no adjustment is made along the y-axis, the final position for the viewpoint is (20-25, 0, 50), or (−5, 0, 50).

Referring again to FIG. 5, after adjusting 506 viewpoint position, system 120 displays 507 a new two-dimensional projection based on the adjusted viewpoint position 204.

Figure 4:
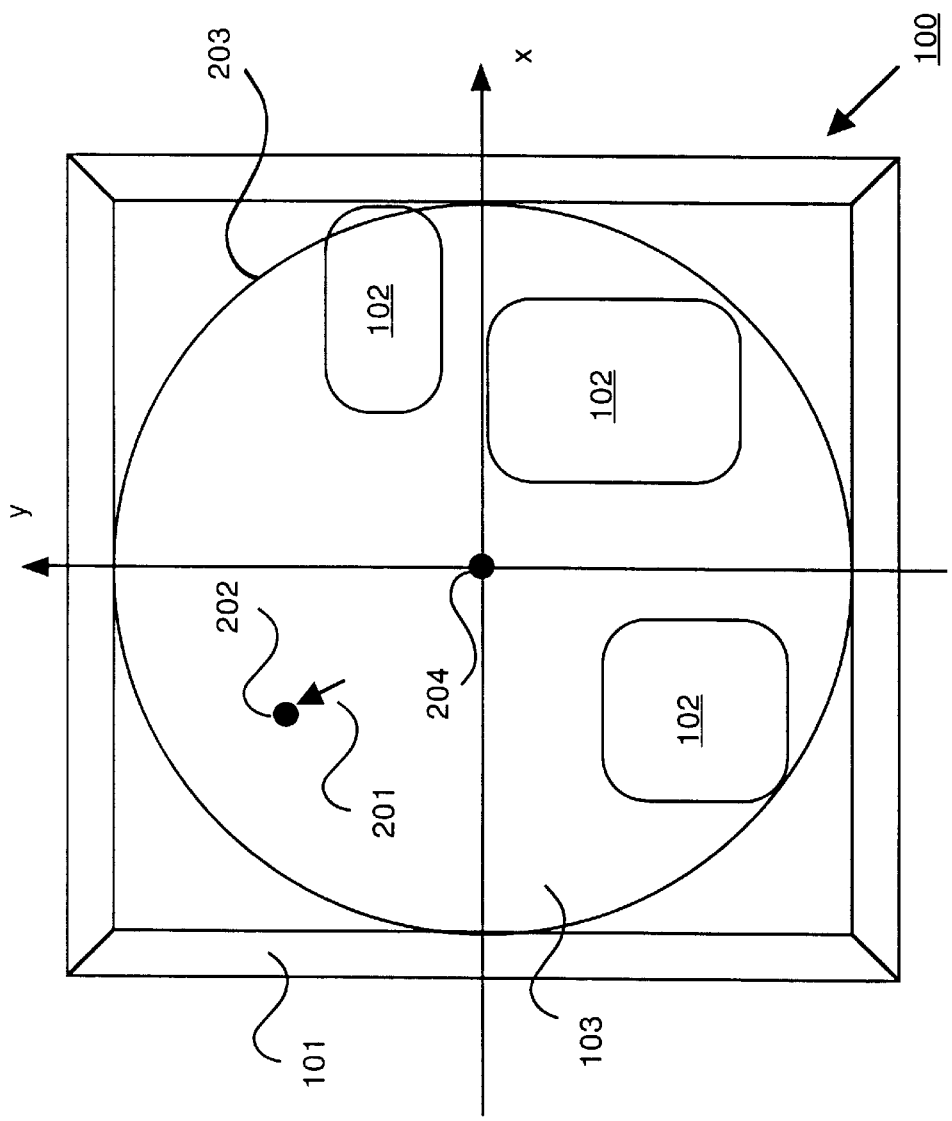
FIG. 4 is a front view of a window containing a two-dimensional projection of a three-dimensional space, after the viewpoint position has moved.

Referring now also to FIG. 4, there is shown an updated front view of window 100 given the starting viewpoint position of FIG. 2 and some degree of movement in the direction indicated by cursor 201.

Referring again to FIG. 5, the user may indicate that continued or additional movement is desired by holding down the mouse button. If additional movement is indicated 508 after the new projection is displayed, system 120 returns to 502 to obtain a new cursor 201 position. If desired, the user may move cursor 201 to another location in window 100, in which case the movement vector will be modified accordingly.

In some applications, system 120 may provide functionality allowing the user to activate and/or move some or all of on-screen objects 120. It then becomes useful to distinguish between user actions specifying viewpoint movement and user actions specifying manipulation or activation of on-screen objects 120. In one embodiment wherein mouse 125 has more than one button, different mouse buttons may be used to represent different actions. For example, a first mouse button may be used to specify viewpoint movement, while a second mouse button may be clicked to activate an object 120 or held down while dragging mouse 125 to move an object 120. In another embodiment, the two functions may be specified by holding down modifier keys on keyboard 126.

In another embodiment, all such functions are implemented using a single mouse button. The desired operation is determined based on the context and nature of the user's action. Thus, if the user positions cursor 201 over an object 120 and clicks the mouse button briefly, object 120 is opened or activated, depending on the nature of object 120. If the user positions cursor 201 over an object 120, clicks and holds the mouse button, and immediately starts dragging cursor 201 to another position, object 120 is moved accordingly. If the user clicks and holds the mouse button for some period of time without substantially changing the position of cursor 201, system 120 interprets the command as a navigation command and moves viewpoint position 204 to simulate movement through the three-dimensional space. Thus, when the mouse button is pressed, system 120 waits some interval of time before commencing movement, in order to determine whether the user intends to drag an on-screen object 102 or move the viewpoint position 204. In one embodiment, this time interval is 0.5 seconds, though other time intervals may be used, and user configuration of the time interval may be permitted. In one embodiment, some small amount of cursor 201 movement is permitted without activating object 120 movement, and user configuration of this "tolerance" amount may be permitted as well.

In one embodiment, if the user clicks the mouse button while cursor 201 is not positioned over any object 102, viewpoint position movement commences immediately, since there is no ambiguity as to the intended action.

The above description provides merely exemplary embodiments for practicing the present invention. Those skilled in the art will recognize that other embodiments are possible without departing from the spirit or essential elements of the invention claimed herein.

What is claimed is:

1. A method for displaying movement through a virtual three-dimensional space, comprising:
   a) determining a viewpoint position in the three-dimensional space;
   b) displaying a two-dimensional projection of the three-dimensional space onto a plane, based on the viewpoint position;
   c) identifying a point on the plane;
   d) identifying a destination position in the three-dimensional space based on the identified point on the plane;
   e) moving the viewpoint position in the direction of the destination position; and
   f) displaying a two-dimensional projection of the three-dimensional space based on the moved viewpoint position.

2. The method of claim 1, wherein c) comprises determining a position of an on-screen cursor.

3. The method of claim 1, wherein d) comprises:
   d.1) defining a sphere having a center corresponding to the viewpoint position; and
   d.2) determining a point on the sphere being the intersection of a line perpendicular to the plane and intersecting the identified point on the plane.

4. The method of claim 1, wherein the identified point has an x-coordinate and a y-coordinate, and wherein d) comprises identifying a destination position having three-dimensional coordinates selected from one of $(x_{cursor}, y_{cursor}, \sqrt{2rm-m^2})$ and $(x_{cursor}, y_{cursor}, -\sqrt{2rm-m^2})$, where $x_{cursor}$ represents the x-coordinate of the identified point and $y_{cursor}$ represents the y-coordinate of the identified point.

5. The method of claim 1, further comprising:
   b.1) defining a z-axis perpendicular to the plane having a positive direction and a negative direction; and
   c.1) identifying one of the positive and negative z-axis directions for movement;
   and wherein d) comprises:
   d.1) defining a sphere having a center corresponding to the viewpoint position; and
   d.2) determining a point on the sphere being the intersection of a line parallel to the z-axis, originating at the identified point on the plane, and constructed in the z-axis direction identified in c.1).

6. The method of claim 5, wherein c.1) comprises determining a position of a key on a keyboard.

7. The method of claim 1, wherein the viewpoint position has an x-coordinate and a y-coordinate, and wherein d) comprises identifying a destination position having x- and y-coordinates corresponding to the x- and y-coordinates of the viewpoint position, and having a z-coordinate corresponding to a predetermined value.

8. The method of claim 1, wherein the viewpoint position has an x-coordinate and a y-coordinate, and wherein d) comprises identifying a destination position having x- and y-coordinates corresponding to the x- and y-coordinates of the viewpoint position, and having a z-coordinate derived by applying a function to the values of the x- and y-coordinates.

9. The method of claim 1, wherein b) comprises displaying the two-dimensional projection in a window having a frame and a center, the frame comprising at least two opposing sides, each opposing side comprising a midpoint, the frame representing at least a portion of the plane, and wherein d) comprises:
   d.1) defining a sphere having a center corresponding to the center of the window and a point of tangency with each midpoint of two opposite sides of the frame; and
   d.2) determining a point on the sphere being the intersection of a line perpendicular to the plane and intersecting the identified point on the plane.

10. The method of claim 1, further comprising:
    c.1) specifying a movement speed;
    and wherein:
    a) comprises determining a viewpoint position in the three-dimensional space, the viewpoint position defined by an x-coordinate, a y-coordinate, and a z-coordinate;
    d) comprises identifying a destination position defined by an x-coordinate, a y-coordinate, and a z-coordinate; and
    e) comprises adjusting the x-coordinate, y-coordinate, and z-coordinate of the viewpoint position by a specified amount based on the specified movement speed, to move the viewpoint position in the direction of the destination position.

11. The method of claim 10, wherein c.1) comprises determining a position of a switch.

12. The method of claim 10, wherein b) comprises displaying a linear two-dimensional projection.

13. The method of claim 10, wherein b) comprises displaying a nonlinear two-dimensional projection.

14. The method of claim 13, wherein the three-dimensional space contains at least one object, the object having an initial position in the two-dimensional projection, the method further comprising:
    e.1) designating one of the at least one objects; and
    e.2) further adjusting the coordinates of the viewpoint position to maintain the initial position of the object in the two-dimensional projection.

15. The method of claim 1, further comprising:
    c.1) detecting an input signal specifying a movement command.

16. The method of claim 15, wherein c.1) comprises detecting that a button is pressed.

17. The method of claim 15, wherein c.1) comprises detecting that a button is held for a predetermined length of time.

18. The method of claim 15, wherein:
c) comprises detecting a position of an on-screen cursor controlled by a mouse having a button;
c.1) comprises detecting that the mouse button is held for a predetermined length of time while the on-screen cursor remains substantially stationary.

19. The method of claim 18, wherein the predetermined length of time is sufficiently long to distinguish the movement command from an object manipulation command.

20. The method of claim 1, wherein the three-dimensional space contains at least one object, at least one of the objects representing a document.

21. A computer program product comprising a computer-usable medium having computer-readable code embodied therein for displaying movement through a virtual three-dimensional space, comprising:
computer-readable program code devices configured to cause a computer to determine a viewpoint position in the three-dimensional space;
computer-readable program code devices configured to cause a computer to display a two-dimensional projection of the three-dimensional space onto a plane, based on the viewpoint position;
computer-readable program code devices configured to cause a computer to identify a point on the plane;
computer-readable program code devices configured to cause a computer to identify a destination position in the three-dimensional space based on the identified point on the plane;
computer-readable program code devices configured to cause a computer to move the viewpoint position in the direction of the destination position; and
computer-readable program code devices configured to cause a computer to display a two-dimensional projection of the three-dimensional space based on the moved viewpoint position.

22. The computer program product of claim 21, wherein the computer-readable program code devices configured to cause a computer to identify a destination position comprise:
computer-readable program code devices configured to cause a computer to define a sphere having a center corresponding to the viewpoint position; and
computer-readable program code devices configured to cause a computer to determine a point on the sphere being the intersection of a line perpendicular to the plane and intersecting the identified point on the plane.

23. The computer program product of claim 21, wherein the viewpoint position has an x-coordinate and a y-coordinate, and wherein the computer-readable program code devices configured to cause a computer to identify a destination position comprise computer-readable program code devices configured to cause a computer to identify a destination position having x- and y-coordinates corresponding to the x- and y-coordinates of the viewpoint position, and having a z-coordinate derived by applying a function to the values of the x- and y-coordinates.

24. The computer program product of claim 21, further comprising:
computer-readable program code devices configured to cause a computer to specify a movement speed;
and wherein:
the computer-readable program code devices configured to cause a computer to determine a viewpoint position comprise computer-readable program code devices configured to cause a computer to determine a viewpoint position in the three-dimensional space, the viewpoint position defined by an x-coordinate, a y-coordinate, and a z-coordinate;
the computer-readable program code devices configured to cause a computer to identify a destination position in the three-dimensional space comprise computer-readable program code devices configured to cause a computer to identify a destination position defined by an x-coordinate, a y-coordinate, and a z-coordinate; and
the computer-readable program code devices configured to cause a computer to move the viewpoint position in the direction of the destination position comprise computer-readable program code devices configured to cause a computer to adjust the x-coordinate, y-coordinate, and z-coordinate of the viewpoint position by a specified amount based on the specified movement speed, to move the viewpoint position in the direction of the destination position.

25. The computer program product of claim 24, wherein the three-dimensional space contains at least one object, the object having an initial position in the two-dimensional projection, and wherein the computer-readable program code devices configured to cause a computer to display a two-dimensional projection of the three-dimensional space onto a plane comprise computer-readable program code devices configured to cause a computer to display a nonlinear two-dimensional projection, the computer program product further comprising;
computer-readable program code devices configured to cause a computer to designate one of the at least one objects; and
computer-readable program code devices configured to cause a computer to further adjust the coordinates of the viewpoint position to maintain the initial position of the object in the two-dimensional projection.

26. The computer program product of claim 21, wherein the computer-readable program code devices configured to cause a computer to identify a point on the plane comprise computer-readable program code devices configured to cause a computer to detect a position of an on-screen cursor controlled by a mouse having a button, the computer program product further comprising:
computer-readable program code devices configured to cause a computer to detect that a button is pressed and held for a predetermined length of time while the on-screen cursor remains substantially stationary, to specify a movement command, the predetermined length of time being sufficiently long to distinguish the movement command from an object manipulation command.

27. An apparatus for displaying movement through a virtual three-dimensional space, comprising:
a memory module for storing a viewpoint position in the three-dimensional space;
a display device, coupled to the memory module, for displaying a two-dimensional projection of the three-dimensional space onto a plane, based on the viewpoint position;
an input device, coupled to the memory module, for identifying a point on the plane;
a destination position identifier, coupled to the memory module, for identifying a destination position in the three-dimensional space based on the identified point on the plane; and a viewpoint position mover, coupled to the memory module for moving the viewpoint position in the direction of the destination position;

wherein the display device further displays a two-dimensional projection of the three-dimensional space based on the moved viewpoint position.

28. The apparatus of claim 27, wherein the destination position identifier defines a sphere having a center corresponding to the viewpoint position and determines a point on the sphere being the intersection of a line perpendicular to the plane and intersecting the identified point on the plane.

29. The apparatus of claim 27, wherein the viewpoint position has an x-coordinate and a y-coordinate, and wherein the destination position identifier identifies a destination position having x- and y-coordinates corresponding to the x- and y-coordinates of the viewpoint position, and having a z-coordinate derived by applying a function to the values of the x- and y-coordinates.

30. The apparatus of claim 27, wherein:

the input device further specifies a movement speed;

the stored viewpoint position is defined by an x-coordinate, a y-coordinate, and a z-coordinate;

the identified destination position is defined by an x-coordinate, a y-coordinate, and a z-coordinate; and the viewpoint position mover adjusts the x-coordinate, y-coordinate, and z-coordinate of the viewpoint position by a specified amount based on the specified movement speed, to move the viewpoint position in the direction of the destination position.

31. The apparatus of claim 30, wherein:

the three-dimensional space contains at least one object, the object having an initial position in the two-dimensional projection;

the display device displays a nonlinear two-dimensional projection; and the viewpoint position mover designates one of the at least one objects and further adjusts the coordinates of the viewpoint position to maintain the initial position of the object in the two-dimensional projection.

32. The apparatus of claim 27, wherein the input device comprises a mouse having a button for controlling an on-screen cursor, and wherein the input device detects that the button is pressed and held for a predetermined length of time while the on-screen cursor remains substantially stationary, to specify a movement command, the predetermined length of time being sufficiently long to distinguish the movement command from an object manipulation command.

* * * * *